Patented Feb. 25, 1936

2,032,142

UNITED STATES PATENT OFFICE 2,032,142

CEMENT

Leon McCulloch, Pittsburgh, Pa., assignor to Westinghouse Electric & Manufacturing Company, East Pittsburgh, Pa., a corporation of Pennsylvania No Drawing. Application October 11, 1934, Serial No. 747,930

4 Claims. (Cl. 106—30)

This invention relates to cement and particularly to a sodium silicate cement which is resistant to water.

In sodium silicate cements which may be employed to unite porcelain or glass to metal, it is desirable that the cement be resistant to water and yet be sound and not subject to detrimental shrinkage after drying. Heretofore, the sodium silicate cements employed had the disadvantage that some of the reaction products of the cement was a soluble sodium salt which upon contact with water was leached out and the cement was weakened.

An object of this invention is to provide a cement, the reaction products of which are substantially insoluble in water.

In practicing this invention, powdered flint of a fineness that will pass through a 200 mesh sieve may be employed as the body of the cement. Other inactive materials such as asbestos, clay or other mineral fillers may, however, be employed as the body of the cement.

In order to make cement which will have reaction products that are not soluble in water, a mixture of sodium silicate, preferably in the form of water glass, and aluminum fluoride is added to and intimately mixed with a body of flint powder and water. The sodium silicate employed is preferably the commercial sodium silicate in which the ratio of soda to silica is 3.8 and which has a specific gravity of approximately 1.4 to 1.45. The sodium silicate and aluminum fluoride react to produce a sodium salt, cryolite, ($Na_3AlF_6$), which is substantially insoluble in water.

The reaction and reaction products resulting from the mixing of sodium silicate and aluminum fluoride may be explained by the following theoretical equation:

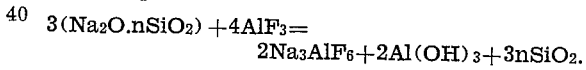

$$3(Na_2O.nSiO_2) + 4AlF_3 = 2Na_3AlF_6 + 2Al(OH)_3 + 3nSiO_2.$$

All of these reaction products are insoluble in water.

A satisfactory cement produced in accordance with this invention comprised the materials in the following proportions:

| | Per cent |
|---|---|
| Powdered flint | 62 |
| Sodium silicate | 14 |
| Water | 14 |
| Aluminum fluoride | 10 |

These products are mixed and applied, then dried or baked at a temperature between 100° and 300° centigrade. The cement formed from these materials and dried within this range will be substantially insoluble in water. It has been discovered, however, that the higher the temperature at which the cement is dried, the weaker it is because of shrinkage. In practice, it has been found that the preferred temperature at which the cement is dried out is between 100° and 175° centigrade.

A cement formed from the materials and in substantially the proportions above described and baked at a temperature of 125° centigrade was found to be very satisfactory. This cement was tested by cementing a joint, drying the cemented joint at the temperature indicated, and then boiling water on the cemented joint for approximately a two hour period. At the end of this test, the cement was found to be still sound and resistant to water.

In practice, the sodium silicate, powdered flint and water are mixed at the manufacturing point and prepared for shipment. The aluminum fluoride is packed separately and is not mixed with the other material until it is desired to employ the cement, at which time the aluminum fluoride is intimately mixed with the other material and reacts with the sodium silicate to form the substantially insoluble sodium salt, cryolite.

It has been found that a cement embodying this invention is desirable for uniting porcelain or glass to metal or repairing cracked or chipped off enamel. Other uses and manner of forming the cement will be obvious to those skilled in the art.

It is, of course, to be understood that various modifications may be made in the cement described without in any way departing from the spirit of this invention and the scope of the claims.

I claim as my invention:

1. A cement comprising the reaction products of a mixture of about 62% of powdered flint, about 14% of sodium silicate, about 14% of water and about 10% of aluminum fluoride.

2. A cement comprising about 62% of powdered flint, about 15% of sodium silicate, about 14% of water and about 10% aluminum fluoride which has been mixed to produce reaction products and dried at a temperature of between 100° and 300° centigrade.

3. A cement comprising the reaction products of a mixture of about 62% of powdered flint, about 14% of sodium silicate, about 14% of water and about 10% alumium fluoride, which has been dried at a temperature of about 125° centigrade.

4. A cement comprising a mixture with about 62% of a mineral filler of the reaction products of about 14% of sodium silicate, about 14% of water and about 10% of aluminum fluoride.

LEON McCULLOCH.